United States Patent Office 3,483,247
Patented Dec. 9, 1969

3,483,247
PREPARATION OF ALIPHATIC BENZYL ESTERS
Robert H. Mills, Webster Groves, Mo., assignor to Monsanto Company, St. Louis, Mo., a corporation of Delaware
No Drawing. Continuation-in-part of application Ser. No. 25,253, Apr. 28, 1960. This application Nov. 9, 1964, Ser. No. 409,946
The portion of the term of the patent subsequent to Dec. 4, 1979, has been disclaimed and dedicated to the Public
Int. Cl. C07c 69/80, 69/34, 69/52
U.S. Cl. 260—475                               17 Claims

ABSTRACT OF THE DISCLOSURE

A process for preparing aliphatic benzyl esters from organic polycarboxylic acids which form anhydrides by reacting an anhydride of such acid with a monohydroxy aliphatic alcohol, a benzyl halide and a trialkylamine.

---

This application is a continuation-in-part of application Ser. No. 25,253, filed Apr. 28, 1960, now abandoned.

This invention relates to a novel process for making aliphatic benzyl esters of organic polycarboxylic acids which form anhydrides. More particularly the process of this invention involves reacting an anhydride of an organic polycarboxylic acid, a monohydroxy aliphatic alcohol, a benzyl halide and a trialiphatic amine by various procedures to produce an aliphatic benzyl ester of said acid, that is an ester containing at least one benzyl group and at least one aliphatic group, in very high yield.

Generally in a commercial operation and in the laboratory aliphatic benzyl esters of acids which form anhydrides, such as alkyl benzyl esters, are usually produced by first forming an alkyl acid ester of the acid by reacting an aliphatic alcohol with an anhydride, dissolving the acid ester in a solvent, usually the alcohol from which the partial ester is prepared, neutralizing the remaining acid group with an inorganic alkali metal salt such as sodium carbonate to form an alkali metal salt of the alkyl acid ester, and reacting said salt with a benzyl halide to provide the desired alkyl benzyl ester. Other aliphatic benzyl esters, such as the cyclic-aliphatic and unsaturated aliphatic benzyl esters, are prepared in a similar manner. Such a process has many attendant disadvantages, however.

For example, water which is formed in the neutralization causes a yield loss because of hydrolysis of partial ester in the early stages of the process and later on because of hydrolysis of the alkali metal salt of the partial ester and benzyl halide. To minimize such yield losses due to hydrolysis it is conventional to utilize conditions which will cause continuous refluxing of the solvent and water and to separate the water before returning the solvent to the reaction zone. Such a procedure requires longer time cycles and necessitates additional equipment such as a distillation column and a condenser, and therefore increases the cost of manufacture. Additionally, though a solvent aids in water removal it in turn creates other problems which contribute to increasing manufacturing costs. Thus $CO_2$ formed by neutralization with alkali metal carbonate causes a loss of a solvent by entrainment thereof as it leaves the reaction zone and the solvent must be recovered, usually by distillation, and thus additional time and equipment is required. Also, since the solvent commonly used is an alcohol, a serious fire hazard is present. Furthermore the reaction of a benzyl halide with an alkali metal salt requires a fairly long time for completion.

Two additional problems are associated with the prior art process. One problem is that the higher molecular weight aliphatic benzyl esters, e.g., alkyl benzyl esters such as benzyl decyl esters, are not readily prepared by such processes because the alkali metal salt of the alkyl acid ester is insoluble in the alcohol from which the partial ester is produced. Another problem is that the excess of higher molecular weight alcohols, $C_8$–$C_{10}$ and higher, because of their high boiling points, are difficult to separate from the desired products after completing the process.

It is, therefore, an object of this invention to provide a process for producing aliphatic benzyl esters of organic carboxylic acids which form anhydrides in which all the attendant disadvantages of the processes of the prior art are eliminated. More specifically, it is an object of this invention to provide a process for producing such mixed esters in which the use of a solvent is unnecessary, none of the problems associated with the formation of water are present, the time required for completion of the reaction is relatively short, and the need for distillation columns, condensers, and other expensive equipment is removed. Additionally, it is an object of this invention to provide a process for producing such mixed esters in very high yields, generally of the order of 95–99%. Other objects and advantages will be apparent from the ensuing description of the invention.

According to the method of this invention an anhydride of an organic carboxylic acid, an aliphatic alcohol, a benzyl halide and a trialiphatic amine are passed into a reaction zone either simultaneously or in portions and heated to produce aliphatic benzyl esters of said acid in yields of the order to 95–99%. In practicing the invention the reaction can be conducted batchwise as for example by adding an aliphatic alcohol, benzyl halide, trialiphatic amine and anhydride simultaneously to a reaction zone, agitating and heating the mixture and thereafter separating the product. On the other hand, the invention is well suited for use as a continuous process as for example a process wherein anhydride, an aliphatic alcohol, benzyl halide and trialiphatic amine are continuously and simultaneously added to a reaction zone maintained at suitable temperatures and aliphatic benzyl ester is continuously withdrawn from said zone in high yield. Thus by one aspect of this invention all the reactants are present in the reaction zone and are heated together to produce the desired mixed ester in high yield.

In another embodiment of this invention acid anhydride, alcohol and amine are added to a reactor and heated, thereby forming a partial ester of the acid. The reaction mass is then passed into a second reaction zone in which benzyl halide is added and the resulting mixture heated to provide the desired product. Alternatively, acid anhydride and alcohol are reacted in a first zone to provide the partial ester of the acid and some unreacted anhydride and alcohol. The reaction mixture is then passed into a second reaction zone in which amine and benzyl halide are also added and the resulting mixture is heated to provide the desired aliphatic benzyl ester.

A still further embodiment of this invention involves the simultaneous addition of amine and benzyl halide to the reaction mass obtained from mixing anhydride and alcohol and slightly heating the resulting mixture, if desired, to speed up the reaction.

The high yields of aliphatic benzyl esters which can be produced by the process of this invention are quite unexpected in view of the fact that the reactants which are used in the process are known to react with each other in a manner different than in said process to produce various products. Thus, for example, a well-known method of producing quaternary salts is by reacting a benzyl halide and a trialiphatic amine, such as triethylamine.

Also it is known that when benzyl halides are heated with trialiphatic amines, there is formed, via a redistribution reaction, benzyl dialiphatic amine and an aliphatic halide. Furthermore, a benzyl halide, such as benzyl chloride, will react with an alcohol, such as an alkanol, in the presence of a base, such as an amine, to form alkyl benzyl ethers. Half esters are also unstable and tend to break down to given anhydride and the alcohol, i.e., the reaction to form half esters does not go to completion. The extent to which this breakdown occurs depends on temperature, with greater breakdown at high temperatures. For butyl acid phthalate (1 hour) this varies from about 10 mol percent at 110° C., to 15 mol percent at 130° C. and about 28 mol percent at 160° C. Also it is known that partial esters of polycarboxylic acids will disproportionate when heated, to form neutral esters and free acid. Thus, for example, butyl acid phthalate when heated will form dibutyl phthalate and phthalic acid. Accordingly, when these various known reactions and others are considered it is readily seen that it is clearly unexpected that yields of aliphatic benzyl esters of the order of 95–99% can be obtained by a process in which all the various reactants of the type described are simultaneously heated in a reaction zone.

The benefits to be derived from the process of this invention are many. For example, this process can be practiced so as to require only one step for the reaction as opposed to several steps by the conventional metal salt process of the prior art, no water is formed, no carbon dioxide is formed, the process does not require the addition of heat since there is ample heat generated in the process, higher molecular weight aliphatic benzyl esters are prepared as easily as the lower molecular weight esters since there is no problem of trying to dissolve the salt of the partial ester in the aliphatic alcohol used in the reaction, the yields are higher than those obtainable by the prior art methods, a solvent is not required in the process and the capital investment required is relatively low. All of these factors contribute to a considerable lowering of the cost of the products which can be produced by the process of the invention. In the instant process the use of a trialiphatic amine greatly increases the rate of half ester formation. This is important for at least two reasons. One is the saving in time. For example at 110° C., over thirty minutes are required to reach the maximum conversion of phthalic anhydride to half ester of about 92%. At this same temperature in the presence of trialiphatic amine, a conversion to about 99% half ester takes only a minute or two. This difference in time results in shorter process time cycles, or in the case of continuous processes, smaller equipment size. The second reason involves the effect of time and temperature on half esters. In addition to the breakdown to alcohol and anhydride, discussed above, there is a further reaction of alcohol with the half ester to form dialkyl ester. For example when butyl acid phthalate was heated at 160° C. the molar proportion of half ester converted to dialkyl phthalate was 18% in four hours and 30% in twenty-four hours. In the prior art process for making benzyl butyl phthalate, it is difficult to make materials having less than 3% dibutyl phthalate. In the instant process, as a consequence of both the faster reaction and the shift in equilibrium, it is easily possible to make benzyl butyl phthalate having less than 0.1% dibutyl phthalate. The presence of dibutyl phthalate as a lower boiling impurity is undesirable because of increased volatility. Concomitant with the formation of dibutyl phthalate is the formation of phthalic acid through the reaction of water, formed in the esterification reaction, with phthalic anhydride. The phthalic acid reacts with benzyl chloride to give dibenzyl phthalate. Again the lower dibenzyl phthalate levels obtainable with the instant process are quite desirable. Thus, the products produced by the method of this invention are considerably purer, an important consideration in many applications and especially so when such products are used as plasticizers, as in vinyl halide resins.

In general, the improved process of this invention should be operated at temperatures in the range of about 50–250° C., since at temperatures below about 50° C. the yield of desired ester decreases significantly and extensive reaction times are required. Similarly, above about 250° C. yield losses also become significant. Preferably temperatures of in the range of about 125°–185° C. are used since the maximum yields are obtained within that range.

Within the temperature range found to be desirable for operation of the process of the invention, i.e., about 50°–250° C., reaction times which provide maximum yields of ester are generally within the range of about ½ to 4 hours depending, of course, upon the reactivity of the reactants, as for example, whether benzyl chloride or the more reactive benzyl iodide is used, and the actual temperature employed. In any case, however, longer times can be employed but no advantages are gained thereby. Accordingly, reaction times should be sufficient to effect substantially complete reaction for the conditions and reactants used, which times can be easily and readily determined.

For maximum yields in a given reactor system the ratio of reactants should be substantially equivalent although it has been noted that slight excesses of trialiphatic amine and benzyl halide, up to about 8–10%, give the maximum yields of ester.

In order to obtain the maximum yield of the esters producible by the process of the invention, it is preferred that the alcohol and trialiphatic amine be relatively water free, i.e., that each contain no more than about 0.75% water; however, the presence of water, although causing a loss in yield, does not render the process inoperative.

The reactants utilized in the process of this invention are as mentioned above (1) anhydrides of organic polycarboxylic acids, (2) benzyl halides, (3) monohydroxy aliphatic alcohols and (4) trialiphatic amines. A detailed description of these reactants follows:

ANHYDRIDES

The anhydrides which can be used in the process of this invention can be of either aliphatic or aromatic acids and can be saturated or unsaturated. Examples of suitable anhydrides are the anhydrides of phthalic, pyromelletic, trimellitic, maleic, succinic and glutaric acid. For the purposes of the process of this invention, the anhydride can be melted prior to addition to a reaction zone or can be in a solid form, as in the form of flakes.

BENZYL HALIDES

The benzyl halides which can be used in the process of this invention are benzyl chloride, benzyl bromide and benzyl iodide as well as the alkyl substituted benzyl halides, e.g., methyl benzyl chloride, methyl benzyl bromide, ethyl benzyl chloride, dimethyl benzyl chloride and the like, the alkoxy substituted benzyl halides, e.g., methoxy benzyl chloride, ethoxy benzyl chloride, dimethoxybenzyl bromide, and the halogen substituted benzyl halides, e.g., chlorobenzyl chloride, chlorobenzyl iodide, dichlorobenzyl bromide, dichlorobenzyl chloride, trichlorobenzyl chloride, bromobenzyl chloride, bromobenzyl bromide, dibromobenzyl chloride, iodobenzyl chloride, and the like.

ALIPHATIC ALCOHOLS

The aliphatic alcohols which can be used in the process of this invention are the monohydroxy aliphatic alcohols, examples of which are the alkanols, such as methyl alcohol, ethyl alcohol, propyl alcohol, isopropyl alcohol, the butyl alcohols, e.g., n-butyl alcohol, and sec.-butyl alcohol, isobutyl alcohol, amyl alcohol, the hexyl alcohols, e.g., n-hexyl alcohol, 1,4-dimethylbutyl alcohol, n-heptyl alcohol, the octyl alcohols, e.g., isooctyl alcohol, n-octyl alcohol, 2-ethylhexyl alcohol, nonyl alcohol, the decyl alcohols, e.g., n-decyl alcohol, isodecyl alcohol, dodecyl alcohol, lauryl alcohol, tridecyl alcohol, tetradecyl alcohol, pentadecyl alcohol, cetyl alcohol, octadecyl alcohol, and eicosyl alcohol; the cyclic-aliphatic alcohols, such as cyclopropylcarbinol, cyclobutyl alcohol, cyclopentyl alcohol, methylcyclopentyl alcohol, dimethylcyclopentyl alcohol, ethyl cyclopentyl alcohol, cyclohexyl alcohol, methylcyclohexyl alcohol, dimethylcyclohexyl alcohol, and cyclooctyl alcohol; and the unsaturated aliphatic alcohols, such as allyl alcohol, crotyl alcohol, and the like. Moreover, while specific alcohols have been described for purposes of illustration, all the various isomeric forms of these alcohols and mixtures thereof are suitable for use in the process of this invention. Furthermore the source of the alcohol does not affect the process and thus for example aliphatic alcohols derived from a one or two stage Oxo process, by the hydration of olefins or by the catalytic dehydrogenation of coconut oil can be used and are in fact desirable because of their availability.

TRIALIPHATIC AMINES

Trialiphatic amines suitable for use in the process of this invention can be represented by the structure,

wherein A, B and C are like or unlike aliphatic radicals. It is preferred because of cost that A, B and C be alkyl radicals. Non-limiting examples of such trialiphatic amines are trimethylamine, triethylamine, tri-n-propylamine, triisopropylamine, tri-n-butylamine, triisoamylamine, trihexylamine, methyldiethylamine, dimethylethylamine, dimethylcyclohexylamine, dimethylhexylamine, benzyl diethylamine, diethylhexylamine, dimethyldecylamine, and the like.

The process of this invention utilizing the foregoing reactants is illustrated in the following non-limiting examples. Parts are parts by weight unless otherwise stated.

EXAMPLE 1

To a suitable reaction vessel having means for the addition and removal of heat, means for measuring the temperature of the reaction mass, means for agitating the reaction mass, means for the addition and removal of solids and liquids and fitted with a condenser there was simultaneously charged 259.2 parts of phthalic anhydride, 185.9 parts of triethylamine, 235.0 parts of benzyl chloride and 130.4 parts of butanol. The resulting mixture was held at a temperature of about 140° C. for about one hour and then washed at about 75°–85° C. with sufficient hydrochloric acid to provide a pH of about 3. Thereafter the oil layer from the acid washing step was washed with aqueous sodium hydroxide, steamed at 110–120° C./100 mm. of Hg, dried at 105–110° C./50 mm. of Hg and cooled to yield 540.7 parts of benzyl butyl phthalate, a yield based on phthalic anhydride of 98.9%.

EXAMPLE 2

Into a suitable reactor system which provides a residence time of about 1½ hours and which was maintained at about 140° C. there was continuously and simultaneously fed phthalic anhydride, benzyl chloride, triethylamine, and butanol, in a weight ratio of about 2:1.8:1.4:1, respectively, while continuously withdrawing a crude product containing essentially benzyl butyl phthalate and triethylamine hydrochloride, which product was collected for further processing. After operating in the above manner over a period of about six hours, the triethylamine hydrochloride was removed from the cude product collected and the remaining crude benzyl butyl phthalate was purified in the manner of Example 1. The average yield of butyl benzyl phthalate, based on phthalic anhydride, was 98.3%.

EXAMPLE 3

Into a suitable reactor system which provided a residence time of about 1¼ hours and which was maintained at about 140° C. there was continuously and simultaneously fed phthalic anhydride, benzyl chloride, decyl alcohol and triethylamine, in a weight ratio of about 1.4:1.27:1.5:1, respectively, while continuously withdrawing a crude product containing essentially decyl benzyl phthalate and triethylamine hydrochloride, which product was collected for further processing. After operating in the above manner for about five hours, triethylamine hydrochloride was removed from the crude product which had been collected and the remaining crude benzyl decyl phthalate was purified in the manner of Example 1. The average yield of benzyl decyl phthalate, based on phthalic anhydride, was 97.4%.

EXAMPLE 4

Into a suitable reactor providing a residence time of about 10 minutes, which was maintained at about 110° C., there was simultaneously and continuously fed phthalic anhydride, triethylamine and butanol in a weight ratio of about 2:1.4:1, respectively. The reaction product was continuously removed and fed to a second reactor system along with benzyl chloride in a weight ratio of about 2.43:1. This second reactor system had a residence time of about 1 hour and was maintained at 140–145° C. The effluent from this continuous reactor system was refined in the manner of Example 1 yielding butyl benzyl phthalate in a yield of 98.5%, based on phthalic anhydride.

EXAMPLE 5

Into a suitable reactor system providing a residence time of 10 minutes, which was maintained at 135° C., there was simultaneously and continuously fed phthalic anhydride and butanol in a weight ratio of about 2:1, respectively. The reaction product was continuously removed and fed to a second reactor system along with triethylamine in a weight ratio of 2.1:1, respectively. This second reactor system had a residence time of about 10 minutes with the temperature held at about 110° C. The reaction product from the second reactor system was continuously withdrawn and fed to a third reactor system along with benzyl chloride in a weight ratio of 2.43:1, respectively. This third reactor system was maintained at 140° C. and had an average residence time of 1 hour. The effluent from the continuous reactor system was refined in the manner of Example 1 yielding butyl benzyl phthalate in a yield (based on phthalic anhydride) of 98.8%.

EXAMPLE 6

Into a suitable reactor system providing a residence time of 10 minutes, which was maintained at 140° C., there was simultaneously and continuously fed phthalic anhydride and butanol in a weight ratio of about 3.2:1, respectively. The reaction product was continuously removed and fed to a second reactor system along with triethylamine and more butanol in an approximate weight ratio of 7.73:4.17:1, respectively. This second reactor system had a residence time of about 10 minutes with the reaction temperature held at 110° C. The reaction product from the second reactor system was continuously fed to a third reactor system along with benzyl chloride in a weight ratio of 2.43:1, respectively. This third reactor system was maintained at about 140° C. and had an average residence time of 30 minutes. The affluent from this reactor system was refined in the manner of Example 1, producing butyl benzyl phthalate in a yield of 98.0%, based on phthalic anhydride.

In a manner similar to the procedure of the above examples other aliphatic benzyl esters can be produced by the process of this invention. A summary of typical results obtained are given in the table below.

| Example Number | Reactants | | | | Weight Ratio of Reactants 1:2:3:4 | Temp., °C. | Residence Time, Hours | Product | Yield Percent Based on Acid Anhydride |
|---|---|---|---|---|---|---|---|---|---|
| | Acid Anhydride (1) | Amine (2) | Alcohol (3) | Benzyl Halide (4) | | | | | |
| 7 | Phthalic | Triethylamine | Methyl | Chloride | 1.1:0.79:0.24:1 | 130 | 2.0 | Benzyl methyl phthalate | 98.1 |
| 8 | do | do | Propyl | do | 1.1:0.79:0.45:1 | 135 | 2.0 | Benzyl propyl phthalate | 98.4 |
| 9 | do | Tributylamine | Butyl | do | 1.1:1.44:0.55:1 | 170 | 1.5 | Benzyl butyl phthalate | 97.9 |
| 10 | do | Triethylamine | do | Bromide | 0.87:.63:.44:1 | 140 | 1.25 | do | 98.0 |
| 11 | do | do | do | Iodide | 0.68:.49:.34:1 | 140 | 1.0 | do | 97.8 |
| 12 | Trimellitic | do | do | Chloride | 0.71:0.79:0.28:1 | 140 | 2.0 | Butyl dibenzyl trimellitate | 98.1 |
| 13 | Maleic | do | do | do | 0.73:0.79:0.55:1 | 140 | 2.0 | Benzyl butyl phthalate | 97.5 |
| 14 | Succinic | do | do | do | 0.74:0.79:0.55:1 | 140 | 2.0 | Benzyl butyl succinate | 97.7 |
| 15 | Phthalic | Dimethyldodecylamine | Amyl | do | 1.1:0.79:0.66:1 | 140 | 1.5 | Amyl benzyl phthalate | 94.3 |
| 16 | do | Triethylamine | Isohexyl | do | 1.1:0.79:0.76:1 | 140 | 1.5 | Benzyl isohexyl phthalate | 99.6 |
| 17 | do | do | Octyl | do | 1.1:0.79:0.97:1 | 150 | 1.25 | Benzyl octyl phthalate | 98.0 |
| 18 | do | do | Tridecyl | do | 1.1:0.79:1.49:1 | 160 | 1.00 | Benzyl tridecyl phthalate | 96.5 |
| 19 | do | do | Allyl | do | 1.1:0.79:0.43:1 | 135 | 2.00 | Allyl benzyl phthalate | 96.0 |
| 20 | do | do | Cyclohexyl | do | 1.1:0.81:0.77:1 | 150 | 1.5 | Benzyl cyclohexyl phthalate | 95.2 |

From the above it is readily apparent that the process of the invention gives high yields of aliphatic benzyl esters of all types of organic polycarboxylic acids which form anhydrides, whether aromatic or aliphatic, saturated or unsaturated. Accordingly, in addition to the various esters shown above there can also be produced by the method of this invention such compounds as dibenzyl dipropyl pyromellitate, dibenzyl dibutyl pyromellitate, dibenzyl di-2-ethylhexyl pyromellitate, dibenzyl methyl trimellitate, dibenzyl octyl trimellitate, dibenzyl tridecyl trimellitate, benzyl butyl glutarate, benzyl hexyl glutarate, benzyl decyl glutarate, benzyl dodecyl glutarate, benzyl methyl succinate, benzyl ethyl succinate, benzyl isohexyl succinate, benzyl 2-ethylhexyl succinate, benzyl decyl succinate, benzyl tridecyl succinate, benzyl methyl maleate, benzyl ethyl maleate, benzyl isohexyl maleate, benzyl 2-ethylhexyl maleate, benzyl isooctyl maleate, benzyl decyl maleate, benzyl dodecyl maleate, benzyl tridecyl maleate, and the like.

Other modes of applying the principles of this invention will be apparent to those skilled in the art. Accordingly, while this invention has been described with reference to various specific examples and embodiments, it is understood that the invention is not limited thereto and that it may be variously practed within the scope of the following claims.

This application is a continuation-in-part of application Ser. No. 25,253, filed Apr. 28, 1960.

The embodiments of the invention in which an exclusive property or privilege is claimed are defined as follows:

1. In a process for producing aliphatic benzyl phthalates, the step comprising reacting a mixture consisting essentially of phthalic anhydride, a trialkyl amine of up to about 20 carbon atoms, a benzyl halide in which the halogen portion thereof is selected from the group consisting of chlorine, bromine and iodine and a monohydroxy alcohol, ROH, where R is selected from the group consisting of alkyl, cycloalkyl and alkenyl radicals, at temperatures within the range of about 50–250° C.

2. A process of claim 1 where the benzyl halide is benzyl chloride and the trialkyl amine is triethylamine.

3. In a process for producing aliphatic benzyl phthalates the step comprising reacting in a mixture consisting essentially of substantially equivalent amounts of phthalic anhydride, a trialkyl amine of up to about 20 carbon atoms, a benzyl halide in which the halogen portion thereof is selected from the group consisting of chlorine, bromine and iodine, and a monohydroxy aliphatic alcohol, ROH, where R is selected from the group consisting of alkyl, cycloalkyl and alkenyl radicals, at a temperature within the range of about 50–250° C.

4. In a process of claim 3 where the trialkyl amine is triethylamine and the benzyl halide is benzyl chloride.

5. In a process for producing alkyl benzyl phthalates the step comprising reacting a mixture consisting essentially of substantially equivalent amounts of phthalic anhydride, triethylamine, benzyl chloride and an alkanol at a temperature within the range of about 50–250° C.

6. In a process for producing benzyl butyl phthalate the step comprising heating a mixture consisting essentially of phthalic anhydride, triethylamine, benzyl chloride and butyl alcohol at a temperature within the range of about 50–250° C.

7. In a process for producing benzyl butyl phthalate the steps comprising passing substantially equivalent amounts of phthalic anhydride, triethylamine, benzyl chloride and butyl alcohol into a reaction zone, therein forming a reaction mixture and maintaining said mixture at a temperature within the range of about 50–250° C.

8. In a process for producing benzyl decyl phthalate the step comprising heating a mixture consisting essentially of phthalic anhydride, triethylamine, benzyl chloride and decanol at a temperature within the range of about 50–250° C.

9. In a process for producing aliphatic benzyl phthalates, the steps comprising (a) forming a partial phthalate ester by reacting phthalic anhydride with a monohydroxy alcohol, ROH, where R is selected from the group consisting of alkyl, cycloalkyl and alkenyl radicals and (b) reacting the partial ester from (a) with a benzyl halide in which the halogen portion thereof is selected from the group consisting of chlorine, bromine and iodine in the presence of a trialkyl amine of up to about 20 carbon atoms.

10. In a process for producing aliphatic benzyl phthalates, the steps comprising (a) forming a partial phthalate ester by reacting phthalic anhydride in the presence of a trialkyl amine of up to about 20 carbon atoms with a monohydroxy alcohol, ROH, where R is selected from the group consisting of alkyl, cycloalkyl and alkenyl radicals and (b) reacting the partial ester from (a) with a benzyl halide in which the halogen portion thereof is selected from the group consisting of chlorine, bromine and iodine.

11. A process of claim 9 where the trialkyl amine is triethylamine.

12. A process of claim 10 where the trialkyl amine is triethylamine.

13. A process of claim 9 where the benzyl halide is benzyl chloride and the trialkyl amine is triethylamine.

14. A process of claim 10 where the benzyl halide is benzyl chloride and the trialkyl amine is triethylamine.

15. In a process for producing benzyl butyl phthalate the steps comprising (a) forming a partial phthalate ester by reacting phthalic anhydride with butyl alcohol and (b) reacting said partial ester from (a) with benzyl chloride in the presence of triethylamine.

16. In a process for producing benzyl butyl phthalate the steps comprising (a) forming a partial phthalate ester by reacting phthalic anhydride with butyl alcohol in the presence of triethylamine and (b) reacting the partial ester from (a) with benzyl chloride.

17. In a process for producing benzyl decyl phthalate the steps comprising (a) forming a partial phthalate ester by reacting phthalic anhydride with decyl alcohol in the presence of triethylamine and (b) reacting the partial ester from (a) with benzyl chloride.

References Cited

UNITED STATES PATENTS 3,067,239  12/1962  Mills _____ 260—475

OTHER REFERENCES

Groggins: Unit Processes in Organic Chemistry, 5th ed., McGraw-Hill, New York, 1958, p. 697.

LORRAINE A. WEINBERGER, Primary Examiner

E. J. SKELLY, Assistant Examiner

U.S. Cl. X.R.

260—485